United States Patent
Piper et al.

[11] Patent Number: 6,144,035
[45] Date of Patent: Nov. 7, 2000

[54] ULTRAVIOLET SENSING APPARATUS

[75] Inventors: Anthony George Standfast Piper; Roderick Nigel Jones, both of London; Gresham Randal Thomas Clacy, County Durham; Martin Thomas Pickering, Cheshire; Adrian Kenworth Taylor; David Michael Hodgkinson, both of Lancashire, all of United Kingdom

[73] Assignee: Advanced Systems Ltd., London, United Kingdom

[21] Appl. No.: 09/066,422

[22] PCT Filed: Oct. 30, 1996

[86] PCT No.: PCT/GB96/02642
§ 371 Date: Apr. 30, 1998
§ 102(e) Date: Apr. 30, 1998

[87] PCT Pub. No.: WO97/16707
PCT Pub. Date: May 9, 1997

[30] Foreign Application Priority Data
Oct. 31, 1995 [GB] United Kingdom .................. 9522219

[51] Int. Cl.⁷ ..................................................... G01J 5/00
[52] U.S. Cl. ............................................................ 250/372
[58] Field of Search .......................... 250/372, 372 EM, 250/336.1, 214.1; 257/432, 436

[56] References Cited

U.S. PATENT DOCUMENTS 3,427,489  2/1969  Walsh ...................................... 250/372

FOREIGN PATENT DOCUMENTS 2198530  12/1986  United Kingdom .

*Primary Examiner*—Seungsook Ham
*Assistant Examiner*—Richard Hanig
*Attorney, Agent, or Firm*—Baker & Daniels

[57] ABSTRACT

UV sensing apparatus comprises a substantially light-proof housing (1), an aperture (1a) formed in the housing, a filter (2) positioned within the housing at the internal mouth of the aperture, a fluorescent member (3) positioned within the housing on that side of the filter remote from that adjacent to the aperture, and a light sensor (4) positioned within the housing to receive light emitted by the fluorescent member. The filter (2) is such that it substantially removes visible light, the fluorescent member (3) is such as to fluoresce when subjected to UV radiation, and the light sensor (4) is positioned so that substantially none of any electromagnetic radiation entering the housing (1) via the aperture (1a) impinges upon the light sensor.

17 Claims, 1 Drawing Sheet

ULTRAVIOLET SENSING APPARATUS

This invention relates to an ultraviolet (UV) sensing apparatus.

UV radiation is produced artificially by special fluorescent tubes for numerous applications. A characteristic of such tubes is that, while of limited effective life in terms of UV production, they also produce visible light but continue to do so, without apparent change in intensity or colour, long after useful production of UV radiation has ceased. Thus, the visible output gives no indication of the condition of such a tube in terms of its continuing effectiveness in producing the desired intensity of UV radiation.

Excessive exposure to UV radiation from the sun causes burning of the skin, and is known to be a cause of melanoma.

Currently available effective devices for measuring UV intensity are bulky, costly and inconvenient for on-site checking of UV tube output. Available low-cost devices for the indication of the intensity of UV produced by the sun are unreliable due to their sensitivity to infra red (IR) radiation and their inability to exclude its corrupting effect.

The aim of the invention is to provide an improved UV sensing apparatus.

Throughout this specification, the term electromagnetic radiation should be taken to mean radiation in the range encompassing UV, visible light and IR.

The present invention provides UTV sensing apparatus comprising a housing which is substantially opaque to electromagnetic radiation, an aperture formed in the housing, a filter positioned within the housing at the internal mouth of the aperture, a fluorescent member positioned within the housing on that side of the filter remote from that adjacent to the aperture, and a light sensor positioned within the housing to receive light emitted by the fluorescent member, wherein the filter is such that it substantially removes visible light, the fluorescent member is such as to fluoresce when subjected to UV radiation, and the light sensor is positioned so that substantially none of any electromagnetic radiation entering the housing via the aperture impinges upon the light sensor.

The filter is necessary to remove visible light, otherwise this could cause fluorescence unrelated to the amount of incident UV radiation, and this would be undesirable.

Preferably, the internal geometry of the apparatus and the refractive indices of IR within the apparatus are such that IR is not reflected internally within the fluorescent member at angles which allow the IR to egress towards the light sensor. Advantageously, the light sensor is shielded an internal housing wall in such a manner that substantially none of any electromagnetic radiation entering the housing via the aperture impinges upon the light sensor.

Conveniently, the aperture is sized so that the electromagnetic radiation entering the sensing apparatus is insufficient to cause saturation of the fluorescent member, and so that the light sensor is not saturated by the light emitted by the fluorescent member. Conveniently, the aperture is circular and has a diameter lying within the range of from 0.25 mm to 3 mm. Preferably, the aperture has a diameter lying within the range of from 0.75 mm to 2 mm.

The filter may be made of a dark blue glass.

In a preferred embodiment, the fluorescent member is an acrylic slab coated on one side with an organic dye which fluoresces when subjected to UV radiation. In this case, the coated side of the acrylic slab may be that side adjacent to the filter. Alternatively, the fluorescent member is an acrylic slab which is doped with an organic dye which fluoresces when subjected to UV radiation. In either case, the dye may be a phosphor.

Advantageously, the dye is such as to emit light of a predetermined frequency when subjected to UV radiation. Preferably, the dye is such as to emit green light.

The fluorescent member may be such that the intensity of fluorescent light emitted is substantially linearly proportional to the intensity of UV radiation received.

Advantageously, for reasons of cost and size, the light sensor is a light-dependent resistor. Preferably, the resistance of the light-dependent resistor varies linearly with the intensity of the received light.

Conveniently, the light sensor is positioned at an edge of the acrylic slab so that fluorescent light passes to the light sensor only by internal reflection within the slab.

A UV sensing apparatus constructed in accordance with the invention will now be described, by way of example, with reference to the drawings, in which.

Figure 1:
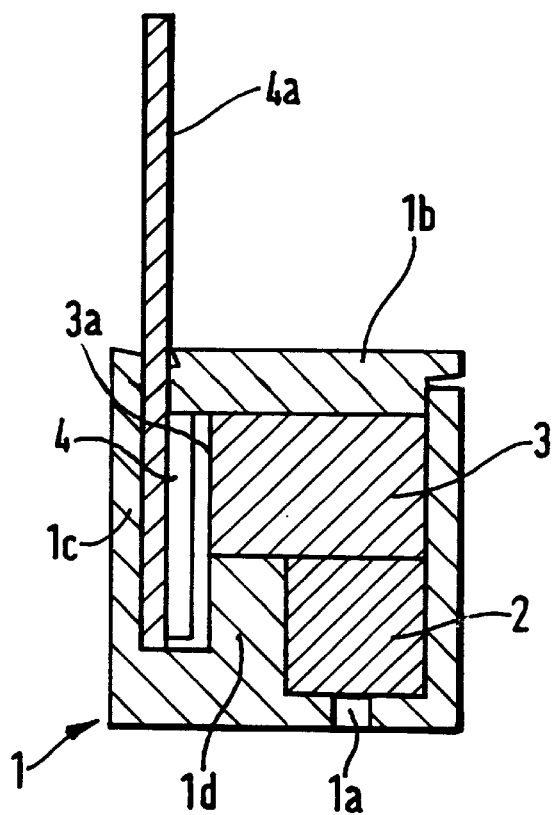
FIG. 1 is a longitudinal section through the sensing apparatus.

Referring to the drawings, FIG. 1 shows a UV sensing apparatus comprising a housing 1 containing a filter 2, a slab 3 and a light sensor 4. The housing 1 is made of a thermosetting plastics material, has external dimensions of 12 mm×8 mm×7 mm and minimum wall thicknesses of 1 mm to 2 mm. The housing 1 is formed with an aperture 1a having a diameter of 2 mm, and with a lid 1b. The filter 2 is made of a dark blue glass such as Schott glass UG11, and has dimensions 3 mm×3 mm×3 mm, the filter being positioned at the internal mouth of the aperture 1a. The slab 3 is made of an acrylic material, measures 5 mm×5 mm×3 mm, and is positioned inside the base of the housing 1. The light sensor 4 is a light-dependent resistor (LDR), which is positioned between a side wall 1c of the housing 1 and one side edge 3a of the acrylic slab 3. The LDR 4 measures 5 mm×5 mm×1.3 mm, and is provided with a pair of electrical connector wires 4a.

The filter 2 is such as to exclude visible light, but to pass UV radiation and IR radiation. On that side adjacent to the filter 2, the acrylic slab 3 is coated with an organic fluorescing dye, such as a phosphor, which gives out green light when exposed to UV radiation. The LDR 4 is sensitive to green light. An internal housing wall 1d extends between the upper edge of the acrylic slab 3 adjacent to the filter 2. The housing 1 is substantially opaque to electromagnetic radiation—the only electromagnetic radiation that can gain access to its interior having to pass through the aperture 1a. The lid 1b is a compression fit within the main body of the housing 1, with the wire connectors 4a protruding between the lid and the main housing body. The compression fit of the lid 1b ensures that no electromagnetic radiation can enter the housing via gaps round the wire connectors 4a.

In use, electromagnetic radiation (visible light, UV radiation and IR radiation) enters the sensing apparatus via the aperture 1a in the housing 1. The filter 2 substantially removes the visible light, so that substantially only UV radiation and IR radiation passes through to the acrylic slab 3. Here, the UV radiation causes the dye to fluoresce with a green light, the intensity of the green light produced being substantially linearly proportional to the intensity of UV radiation. The green light thus produced is channelled by the acrylic slab 3 by internal reflection to all edges of the slab 3. This green light is, therefore, incident upon the LDR 4. This produces a change in the electrical resistance of the LDR 4, this change being substantially linearly proportional to the intensity of the received green light, and hence is substantially linearly proportional to the intensity of UV radiation received by the sensor. The internal wall 1d prevents any radiation reaching the LDR 4 from the filter 2.

The LDR 4 is connected to electronic circuitry (not shown) which allows an accurate analogue or digital meter reading to be displayed. Thus, the UV sensor can also measure the UV intensity as well as sensing it. Alternatively, the change in resistance of the LDR 4 could be used to illuminate an appropriate number of light emitting diodes (LEDs) of a fixed plurality of LEDs, this number being dependent upon the resistance change. In either case, a visual measure of the UV intensity is provided.

The sensing apparatus is designed so that, the maximum intensity of UV radiation expected for a given application is below the level at which the fluorescent dye becomes saturated, and so ceases to give a further increment in response. Similarly, the LDR 4 is chosen so as not to reach saturation.

The component parts are chosen in order to achieve a reasonably linear response to an increase in the intensity of UV radiation within a given range. For example, the amount of radiation which can enter the housing 1 is limited by the size of the aperture 1a, which should lie within the range of from 0.25 mm to 3 mm.

The 'view angle' (i.e. the cone of radiation formed in the filter 2 by the aperture 1a) is likewise determined by the shape of the aperture 1a, and can be altered to suit different applications. Thus, a narrow field of view would be used for spot monitoring say of fluorescent tubes, whereas a wider angle would be used for pointing in the direction of the sun for measuring solar UV.

The reaction of the sensing apparatus is determined by the specification of the LDR 4, the coated acrylic slab 3, the filter material 2, and the aperture size 1a.

The sensing apparatus is designed so as to achieve a high percentage rejection of radiation other than UV by positioning and screening the components such that no radiation other than fluorescent green light can impinge directly upon the LDR 4, and substantially only green light will reach the LDR by internal reflection within the acrylic slab 3. In this connection, acrylic is an ideal material for the slab 3, as its high transparency to visible light ensures that the visible light produced by the fluorescence is efficiently internally reflected, thereby leading to accurate measurement of UV.

The sensing apparatus is substantially insensitive to IR radiation by virtue of the positioning of the LDR 4. Unlike many known UV sensors, therefore, that described above needs only one filter (that to remove visible light) known sensors incorporate additionally special filters to remove IR radiation, and these are expensive. The aperture 1a is of suitably small dimensions to confine the IR radiation to a specific location within the filter 2 and the acrylic slab 3. IR radiation is prevented from reaching the LDR 4 by the internal geometry of the device, and because the refractive indices of IR within the device are such that IR is not reflected internally at angles which allow it to egress sideways from the slab towards the LDR 4.

The degree of directionality can be varied as desired according to the needs of the application by altering the geometry of the aperture 1a, and adjusting the dimensional relationships of the other components to ensure that saturation is avoided and that the IR radiated cone does not impinge on the LDR 4.

It will be apparent that the sensing apparatus described above could be modified in a number of ways. In particular, the slab 3 could be doped with an organic fluorescing dye (such as a phosphor) rather than being coated on one side with dye. In either case, it should be noted that acrylic is substantially opaque to UV, but is highly transparent to visible light. The advantage of coating (rather than doping) the slab 3 is that it leads to a significantly better response time, there being no need for the UV to pass through any of the opaque acrylic before fluorescence occurs. The dimensions of the coated acrylic slab 3 are not critical, and can be conveniently chosen to suit the dimensions of the other components of the device. The slab 3 could also be made of other materials if suitably coated or doped/impregnated with a fluorescing dye.

Figure 2:
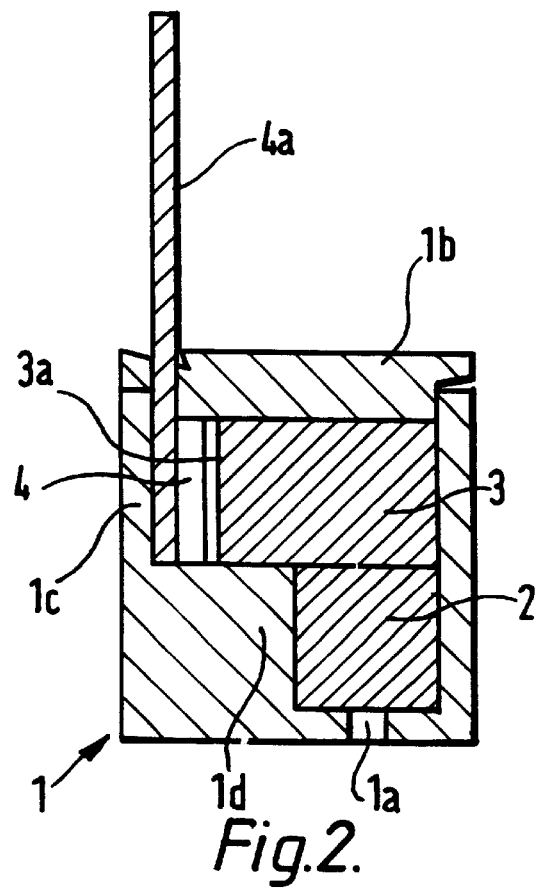
FIG. 2 is a longitudinal section through a modified form of the apparatus of FIG. 1.

Depending upon the size of the LDR 4, it would be possible to dispense with the internal wall 1d. Thus, if the LDR 4 was positioned so that its end face was flush with (no higher than) the surface of the slab 3 adjacent to the filter 2, and the internal configuration of the housing was modified (for example as shown in FIG. 2), the LDR would receive no electromagnetic radiation from the filter 2.

If improved directionality is required, a long, narrow, opaque tube could be provided at the external mouth of the aperture 1a. This would make the sensing apparatus more directional, which would be particularly useful when testing UV tubes in close proximity to one another. Such a tube could be made of insulating material to eliminate the risk of electric shock when the sensing apparatus is used to test electric fly trap units. The tube could also be used as a spacer to ensure that UV measurements are all carried out with the sensing apparatus a predetermined distance away from the device being tested, thereby ensuring consistent results.

In another modification, two light sensors 4 would be used. One of these sensors would be shielded from all radiation (including the green light) and additional circuitry would be provided to compensate for the effects of ambient temperature change.

It would also be possible to add specific filters to narrow the bandwidth for other uses. Moreover, the LDR could be replaced by any other suitable form of photosensitive device.

The UV sensing apparatus described above has the important advantage of producing a substantially linear response to incoming UV radiation. Moreover, by avoiding the need for more than one (simple) filter, and by using only a small number of readily-available components, the sensing apparatus can be manufactured at a substantially lower cost than the more complex devices currently available. In particular, the use of an expensive additional filter to remove IR is avoided—in this connection, it should be noted that all low-cost light sensors are sensitive to IR, hence the importance of preventing IR reaching the sensor. The sensing apparatus also exhibits excellent immunity to IR radiation and visible light, and can have a broad spectrum sensitivity over the UV ranges 'A' and 'B', or over selected bandwidths using different filters.

The sensing apparatus can be used for checking substantially any type of UV device, such as sun bed lamps, fly trap lamps, EPROM eraser lamps, resin curing lamps (of the type used in dentistry) and glue curing lamps as used in electronic component assembly. The sensing apparatus can also be used to measure the level of ambient or background UV to provide a more accurate assessment of the condition of a UV source and its effectiveness in situ, by deducting the measurement of ambient or background UV from the aggregate measurement of ambient or background UV and that from the source. It can likewise be used for pre-installation site assessment where ambient or background UV could be an influence on the performance of a UV-emitting machine (such as an electronic insect killer) to be installed.

It can also be used to measure UV produced by the sun, and so can act as a sun bathing aid to avoid excessive exposure to the sun, or as a device for estimating the effects of the sun on external paints, coatings or plastics materials.

What is claimed is:

1. UV sensing apparatus comprising a housing which is substantially opaque to electromagnetic radiation, an aperture formed in the housing, a filter positioned within the housing at the internal mouth of the aperture, a fluorescent member positioned within the housing on that side of the filter remote from that adjacent to the aperture, and a light sensor positioned within the housing to receive light emitted by the fluorescent member, wherein the filter is such that it substantially removes visible light, the fluorescent member is such as to fluoresce when subjected to UV radiation, and the light sensor is positioned so that, without the provision of a second filter, substantially none of any electromagnetic radiation entering the housing via the aperture impinges upon the light sensor, and wherein the internal geometry of the apparatus and the size of the aperture are such as to constrain the angles of electromagnetic radiation entering the apparatus so that IR radiation is not reflected internally within the fluorescent member at angles which allow the IR radiation to egress towards the light sensor.

2. UV sensing apparatus as claimed in claim 1, wherein the refractive indices of IR within the apparatus are such that IR is not reflected internally within the fluorescent member at angles which allow the IR to egress towards the light sensor.

3. UV sensing apparatus as claimed in claim 1, wherein the light sensor is shielded by an internal housing wall in such a manner that substantially none of any electromagnetic radiation entering the housing via the aperture impinges upon the light sensor.

4. UV sensing apparatus as claimed in claim 1, wherein the aperture is sized so that electromagnetic radiation entering the sensing apparatus is insufficient to cause saturation of the fluorescent member, and so that the light sensor is not saturated by the light emitted by the fluorescent member.

5. UV sensing apparatus as claimed in claim 1, wherein the aperture is circular and has a diameter lying within the range of from 0.25 mm to 3 mm.

6. UV sensing apparatus as claimed in claim 5, wherein the aperture has a diameter lying within the range of from 0.75 mm to 2 mm.

7. UV sensing apparatus as claimed in claim 1, wherein the filter is made of a dark blue glass.

8. UV sensing apparatus as claimed in claim 1, wherein the fluorescent member is an acrylic slab coated on one side with an organic dye which fluoresces when subjected to UV radiation.

9. UV sensing apparatus as claimed in claim 8, wherein the coated side of the acrylic slab is that side adjacent to the filter.

10. UV sensing apparatus as claimed in claim 1, wherein the fluorescent member is an acrylic slab which is doped with an organic dye which fluoresces when subjected to UV radiation.

11. UV sensing apparatus as claimed in claim 8, wherein the organic dye is a phosphor.

12. UV sensing apparatus as claimed in claim 8, wherein the dye is such as to emit light of a predetermined frequency when subjected to UV radiation.

13. UV sensing apparatus as claimed in claim 12, wherein the dye is such as to emit green light.

14. UV sensing apparatus as claimed in claim 1, wherein the fluorescent member is such that the intensity of fluorescent light emitted is substantially linearly proportional to the intensity of UV radiation received.

15. UV sensing apparatus as claimed in claim 1, wherein the light sensor is a lightdependent resistor.

16. UV sensing apparatus as claimed in claim 15, wherein the resistance of the light-dependent resistor varies linearly with the intensity of the received light.

17. UV sensing apparatus as claimed in claim 8, wherein the light sensor is positioned at an edge of the acrylic slab so that fluorescent light passes to the light sensor only by internal reflection within the slab.

* * * * *